F. MÜLLER.
CHAIN ASSEMBLING MACHINE.
APPLICATION FILED MAR. 10, 1916. RENEWED MAY 14, 1919.

1,365,940. Patented Jan. 18, 1921.
7 SHEETS—SHEET 1.

Witnesses:

Inventor
Frederich Müller
By his Attorneys

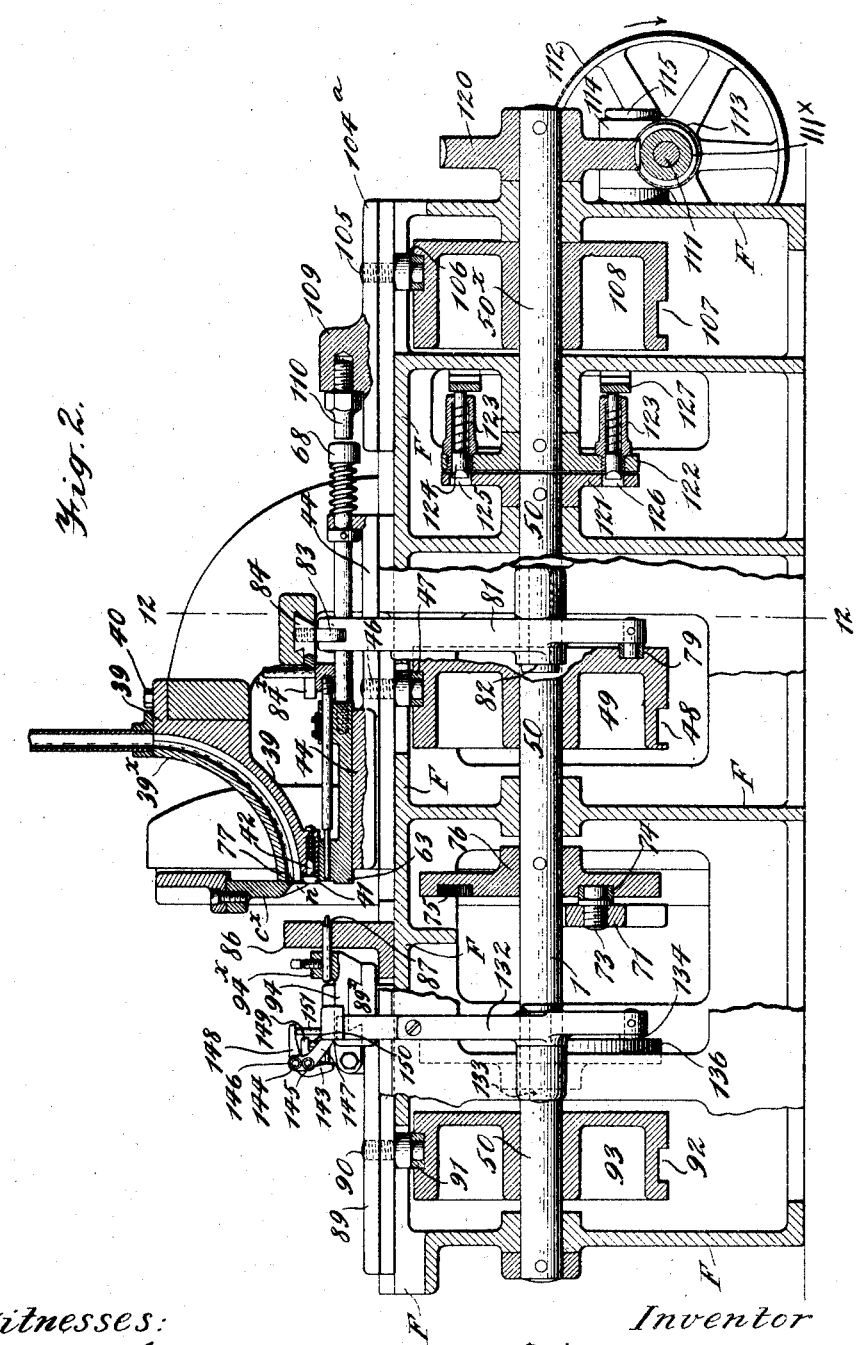

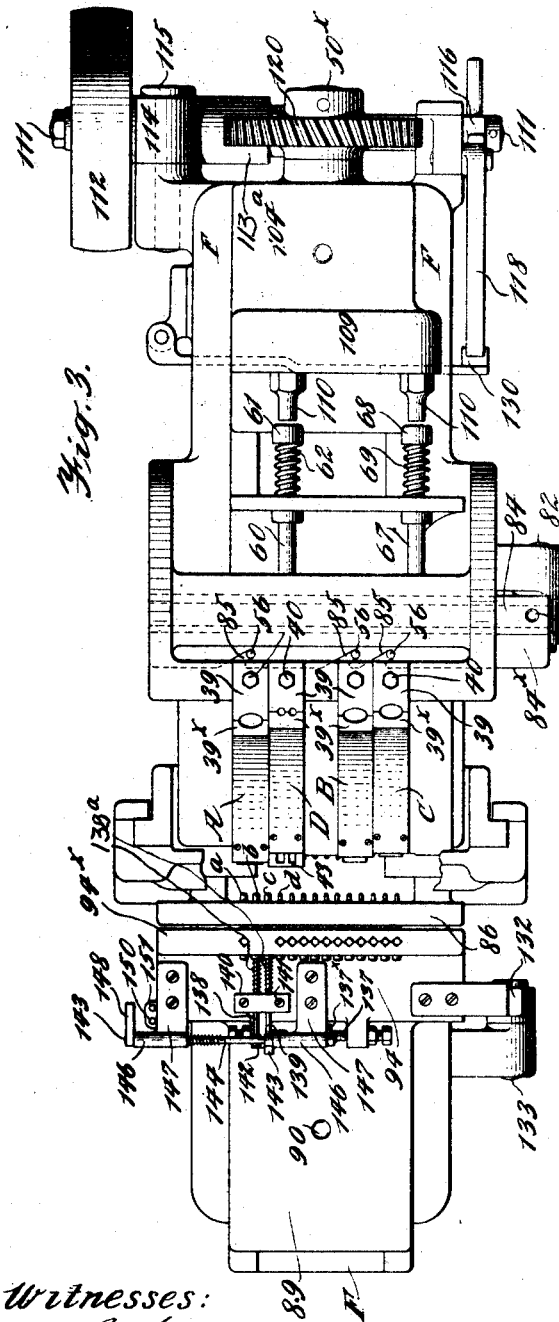

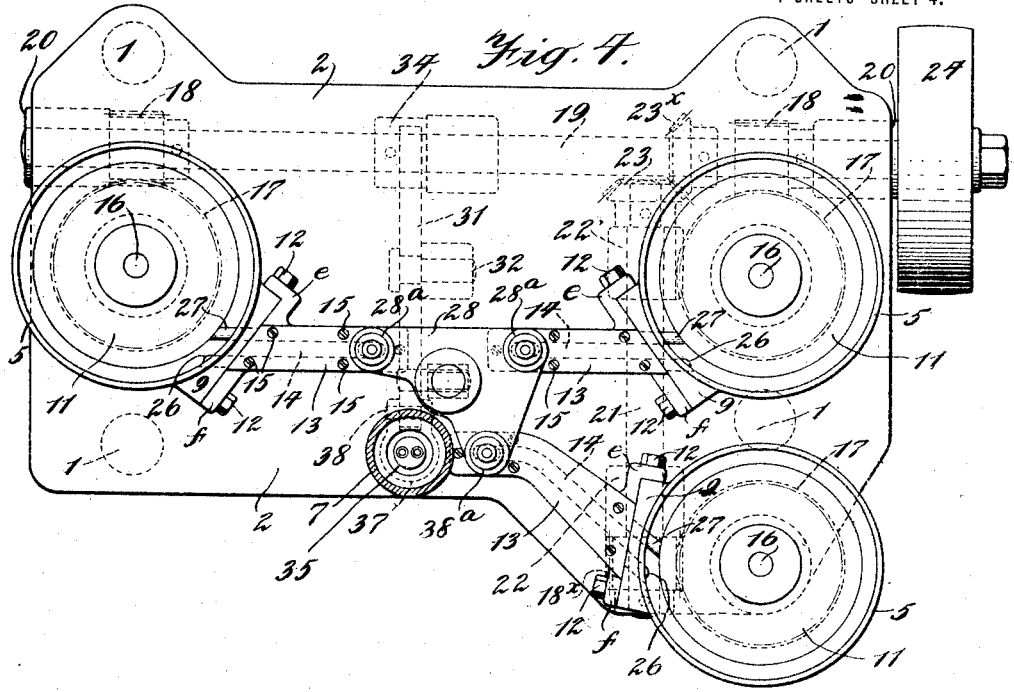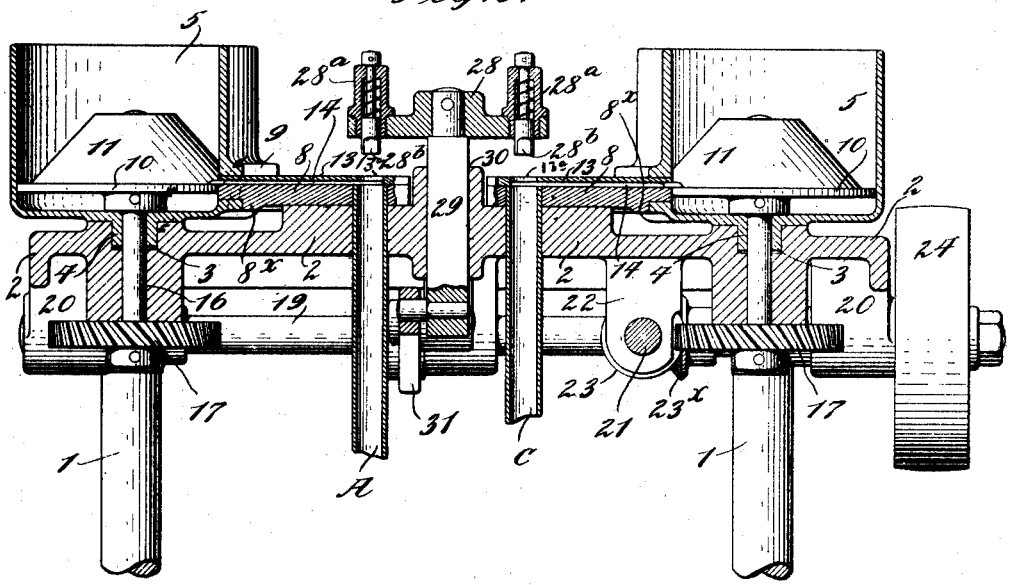

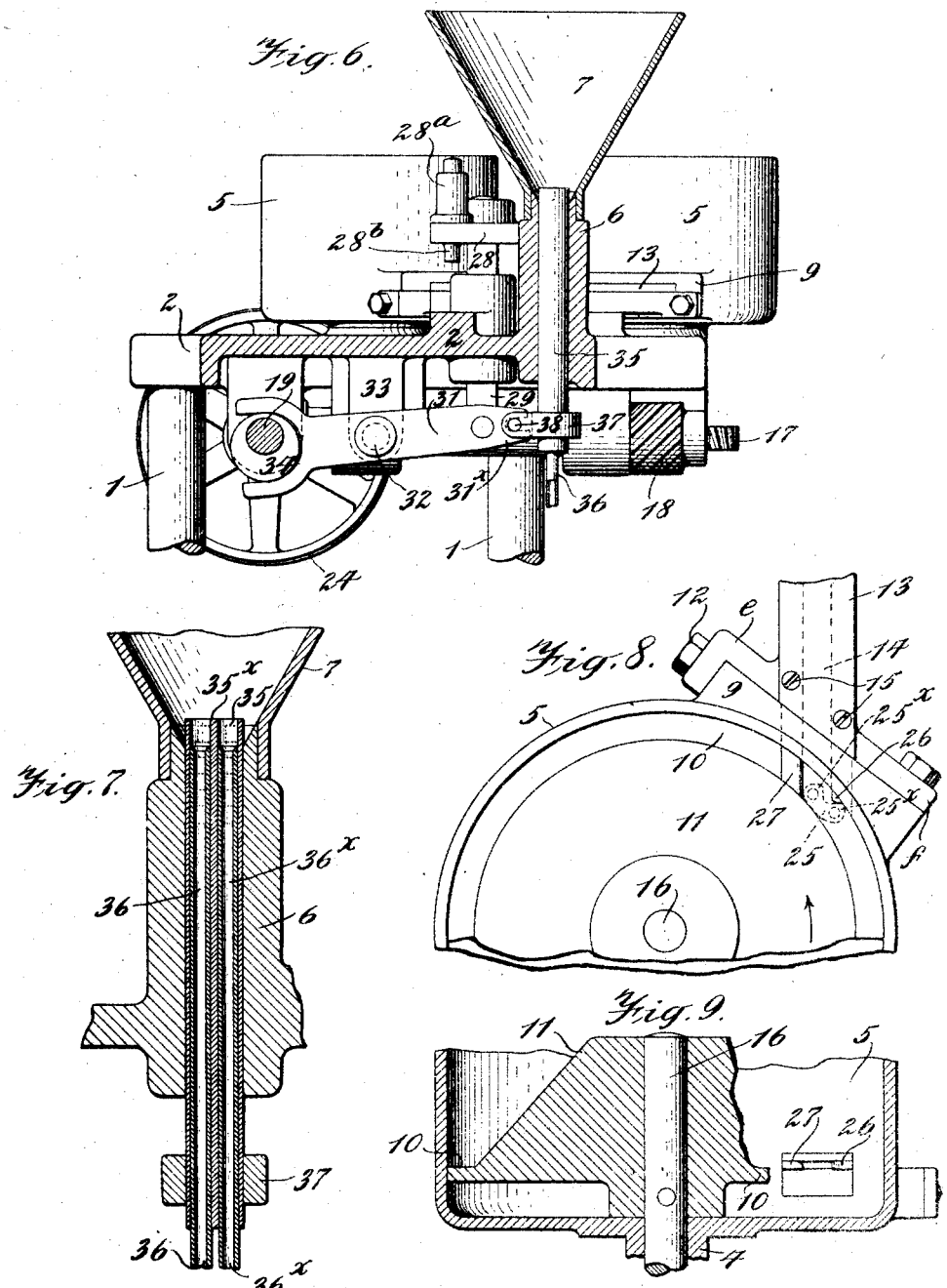

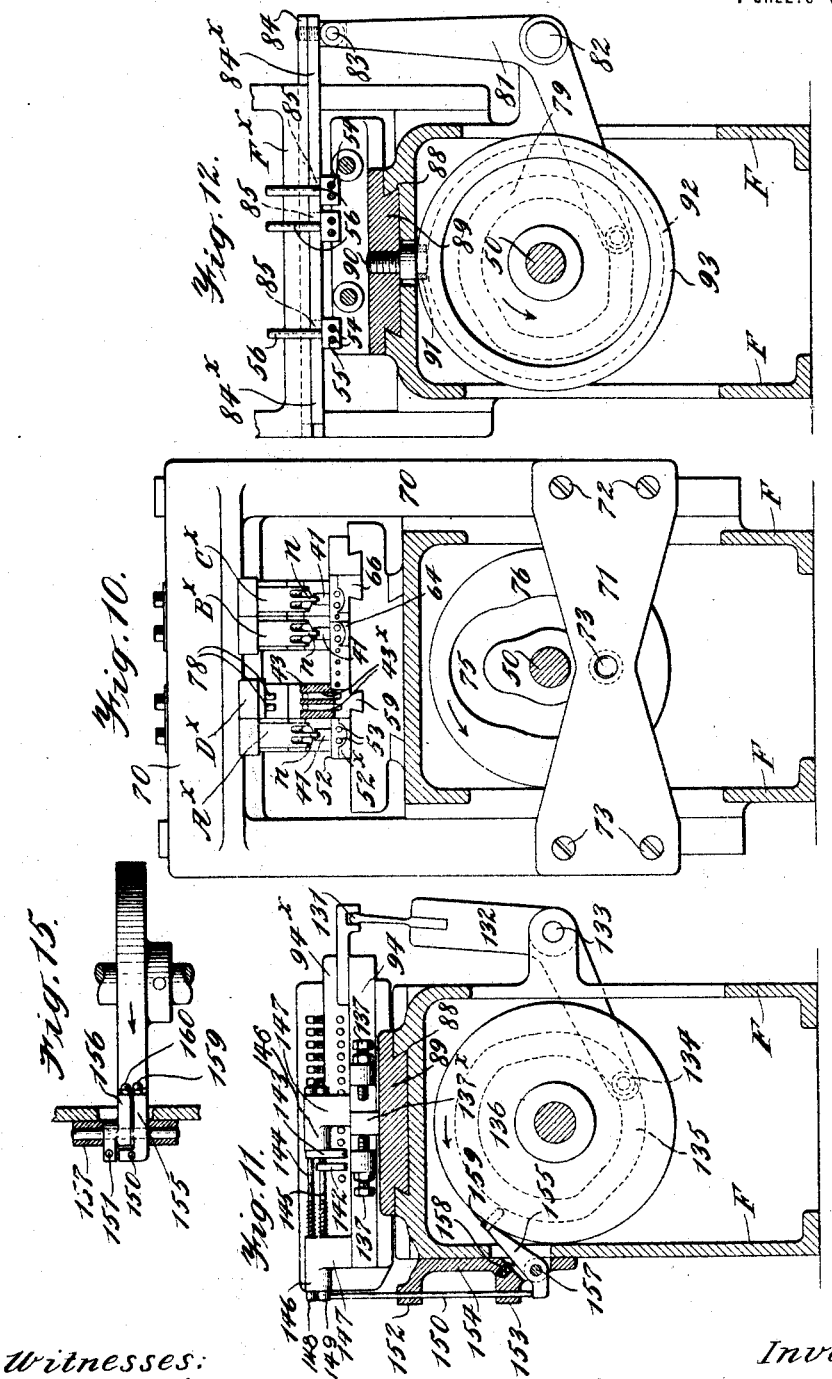

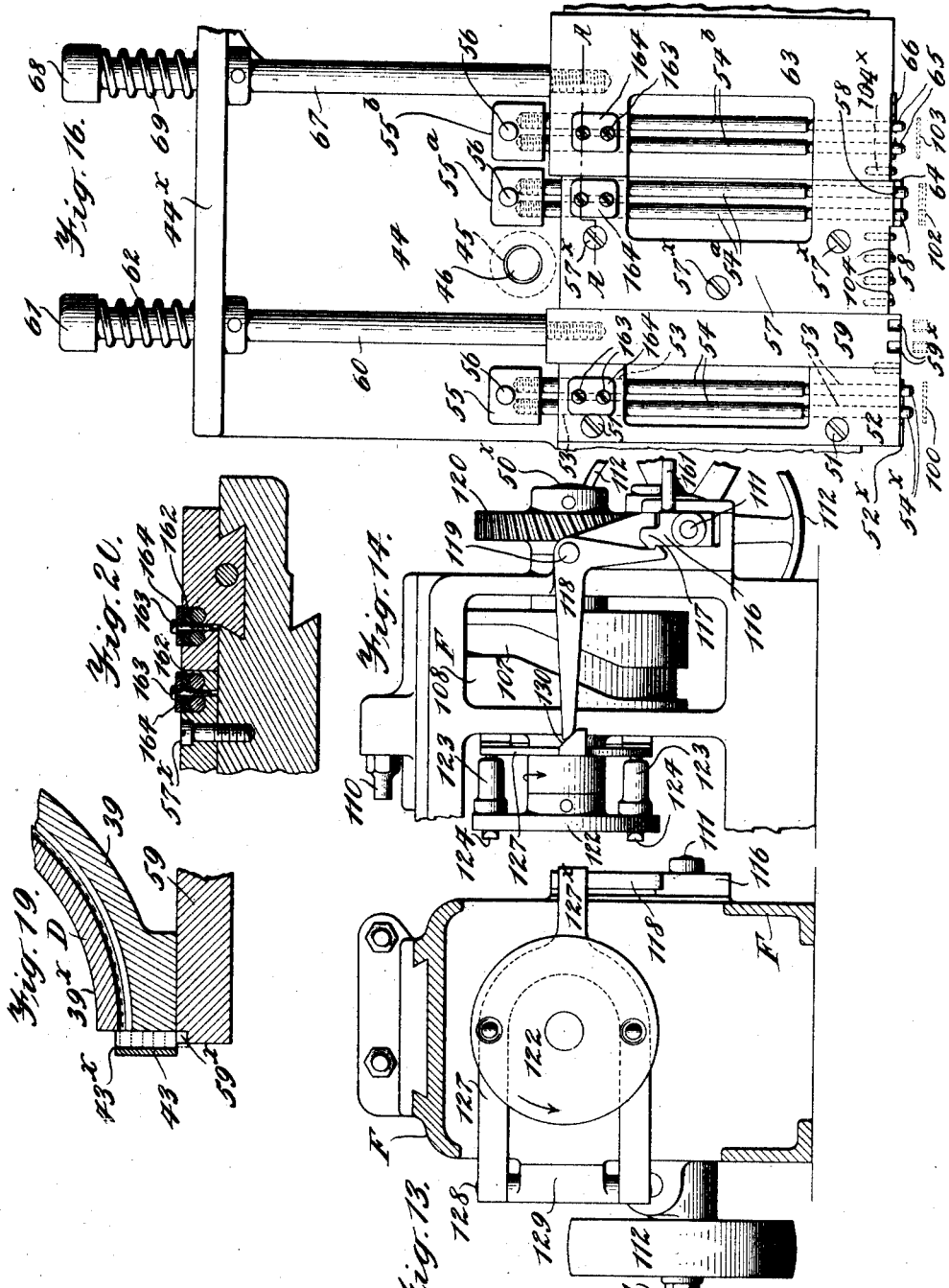

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

CHAIN-ASSEMBLING MACHINE.

1,365,940.  Specification of Letters Patent.  Patented Jan. 18, 1921.

Application filed March 10, 1916, Serial No. 83,248. Renewed May 14, 1919. Serial No. 297,161.

*To all whom it may concern:*

Be it known that I, FRIEDERICH MÜLLER, a citizen of the United States, residing at Hartford, in the county of Hartford and State of Connecticut, have invented certain new and useful Improvements in Chain-Assembling Machines, of which the following is a specification.

This invention relates to chain assembling machines, and has for its object to provide a machine adapted to automatically assemble the links and connecting elements forming the chain structure.

The preferred embodiment of the invention as herein described comprises five trains of mechanism, to wit: hopper and chute mechanism for the chain parts, ejector mechanism adapted to remove a desired number of parts from the chutes, transfer and compression mechanism, feeding mechanism, and safety-stop mechanism. The present embodiment of the invention is adapted to assemble a chain, or chain unit, comprising sets of two oppositely arranged "outer" links, each set embracing at one end an "intermediate" link connection with a preceding set of "outer" links and embracing at the opposite end an intermediate link connection with a succeeding set of outer links, each set of outer links being connected with the "intermediate links" by a pair of connecting elements, for example, a pair of "bushings."

The links and bushings, in a preferred embodiment, are placed in hoppers and are fed from the hoppers into a series of chutes which carry the said parts into register with ejector mechanism. The ejector mechanism removes the desired number of parts from the chutes and delivers the same to an assembling means, preferably embodying a transfer and compression mechanism, and the latter mechanism in co-action with the feeding mechanism, assembles the said parts. The feeding mechanism acts to carry an initial outer link first into register with that member of the transfer mechanism which advances a connecting element, i. e. a bushing, secondly, into position to receive a second connecting element or bushing, thirdly, to connect said first bushing to an "intermediate" link or links, fourthly, to connect said second bushing with a succeeding intermediate link or links, and fifthly, into position to receive an opposite outer link connecting its two bushings and completing the chain or chain unit to that point. The safety-stop mechanism is such that when any interruption occurs in the transfer of bushings, or when for any cause the assembling of the chain does not proceed in proper sequence and a part is improperly placed and "jams," the increased load resulting on the machine throws the safety-stop into action and the machine comes to a stop. A description will subsequently be given of each train of mechanism in its order.

In the drawings Figure 1 is a front elevation partly in section and with parts broken away of a machine embodying the improvements;

Fig. 2 is a longitudinal section of the same below the hopper mechanism;

Fig. 3 is a plan view of the machine below the hopper mechanism;

Fig. 4 is a plan view of the hopper mechanism;

Fig. 5 is a transverse sectional view of the hopper mechanism;

Figs. 6, 7, 8 and 9 are detail sectional views of certain elements of the hopper mechanism;

Fig. 10 is a front elevation, partly in section, of the lower portion of the machine, illustrating members of the ejector and transfer mechanism;

Fig. 11 is a transverse sectional view of the lower portion of the machine illustrating members of the feeding and safety-stop mechanism;

Fig. 12 is a transverse section of the machine on the line 12—12, Fig. 2;

Figs. 13, 14 and 15 are detail views of the safety-stop mechanism and certain driving parts;

Fig. 16 is a plan view of the transfer mechanism;

Figs. 17 and 18 are detail sectional views of transfer and feeding elements;

Figure 1:
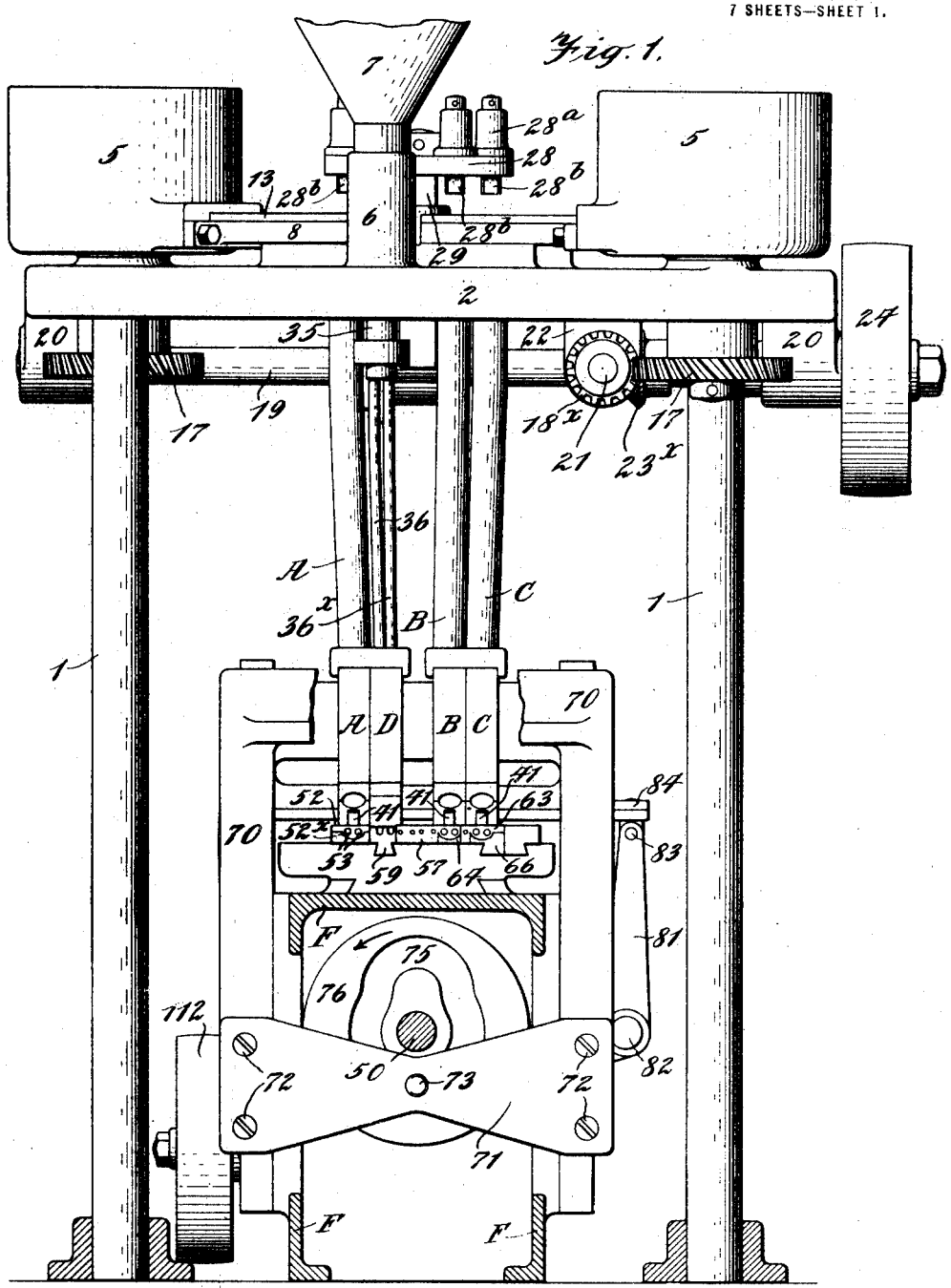

Fig. 17$^a$ is a view illustrating in connection with Fig. 17 the formation of a chain;

Fig. 18$^a$ is a similar view in connection with Fig. 18;

Fig. 19 is a sectional view of the lower portion of a chute for the bushings, and the forward portion of a bushing transfer member; and Fig. 20 is a transverse sectional view of certain members of the transfer mechanism on the line A—A, Fig. 16.

*The hopper and chute mechanism.*—Supported upon a series of standards 1 is a table 2 which is provided with a series of countersunk seats 3 to receive the depending base projections 4 of a series of hoppers 5, three in the present instance, which are designed to hold links; and the table also is provided with a vertically projecting boss 6 reduced at its upper end to afford a seat for the reduced lower end of a hopper 7 adapted to hold the link-connecting elements or bushings. Approximately at the longitudinal center of the table three apertures are formed in the latter for the reception of three chutes A, B and C, and each chute is connected with its hopper by means of a slide-way formed as follows: The base of each slide-way is a plate 8 formed with an aperture for the reception of its chute. At one point the wall of each hopper is thickened as at 9 and formed with an opening into which one end of the plate 8 projects, a shoulder 8× on the plate contacting with an outer face of the hopper, see Fig. 5. The upper face of each plate 8 is at a level with the upper horizontal face of a rim or flange 10 of a rotary cone 11 within each hopper 5, the cone being of a size to fit the hopper somewhat closely so that no appreciable space is permitted between rim 10 and the hopper wall. It will be understood that the rotation of cone 11 will tend by centrifugal action to force the links outwardly and thus through the opening in the hopper wall and onto slide-plate 8. Each plate 8 is formed with a laterally projecting arm $e$ and a second laterally projecting arm $f$, each of which is secured to the wall 9 of the hopper by the bolt 12. Each plate 8 is provided with a cover plate 13 formed with a longitudinal channelway 14 to permit passage of the links and is secured to the slide-plate by means of a series of fastening screws 15.

An opening 13$^a$ is formed near the outer end of each cover plate and in register with the appropriate chute for the passage of the end of a tamping member, hereinafter described. (See Fig. 5.) Each rotary cone 11 is provided with a spindle 16 projecting through an opening formed in the table and having secured thereon at its lower end a gear wheel 17. Each of the two rearmost gear wheels 17 is in mesh with a gear wheel 18 on a shaft 19 extending transversely of and journaled in suitable bearing bosses 20 afforded by the table 2. The rotary cone in the foremost of the three hoppers is, as indicated in Fig. 4, driven through the connection with its gear wheel 17 of a gear wheel 18× at one end of a shaft 21 journaled below the table 2 in suitable bearing bosses, such as 22, and connected at its rear end by means of gears 23, 23× with shaft 19. Shaft 19 is provided with a band wheel 24 driven by a belt from any suitable source of power.

As indicated in Fig. 8 the links, of which one is shown in dotted lines at 25 (Fig. 8), are fed endwise into the slide-way channel 14. To insure that each link will be fed endwise into the slide-way 14, a stop-shoulder 26 is placed at one side of the slide-way to project slightly beyond the inner wall of the hopper immediately above the flange 10 of the rotary drum, and at the opposite side of the slide-way is placed a turning-blade 27. As the drum rotates in the direction of the arrow, Fig. 8, the links will be thrown outwardly against the wall of the hopper and those resting directly upon the rim 10, with their points 25× turned inwardly, will not be affected by the shoulder 26 and turning-blade, but will be pushed inwardly by the shoulder and passed over the blade. But when a link comes into proper position on the flange 10, that is, with its points turned toward the outer wall, its forward portion will strike turning-blade 27 about the same time that its rearward point will strike shoulder 26, so that the link will be swung to the right and endwise into the slide-way 14, the pressure of succeeding links feeding it forward until it comes into register with its proper chute.

When a link comes into register with its chute, it is subjected to the action of a reciprocatory tamping device. The tamping device comprises the horizontally disposed triangular-shaped plate 28 carrying at each of its corners a socket member 28$^a$ in which is housed the spring-pressed plunger 28$^b$ in register with a chute opening. Plate 28 is carried at the upper end of a rod 29 slidingly fitted within an aperture 30 formed in table 2, and projecting below said table for connection with a lever 31 fulcrumed at 32 upon a bracket arm 33 depending from table 2, the said lever being formed with a yoke-shaped rearward end to embrace an eccentric 34 upon shaft 19. It will be understood that endwise reciprocation of lever 31 will impart reciprocatory movements to the tamping device, and that the plungers 28$^b$ will be brought into contact with links fed into register with the chutes, and that said links will be forced downwardly.

Lever 31 is also utilized to impart reciprocatory movements to an agitator 35 located within the bushing-hopper 7. Agitator 35 is in the form of a sleeve having a central longitudinal division wall 35× separating the sleeve into two compartments, each compartment receiving one of two stationary chutes 36, 36× for the bushings, said chutes 36, 36× being connected at their lower ends to the chute D. A ring 37 is clamped upon the agitator-sleeve 35 near its lower end, the said ring carrying a pin 38 embraced by the forked end 31× of lever 31. By the aforesaid instrumentalities the agitator sleeve 35 is given reciprocatory movements within hopper 7 simultaneously with the movements of the tamping device 28.

Each chute A, B, C and D is formed with an outwardly curved lower section comprising the rear plate 39 and front plate 39ˣ, the said plates being secured to a part of the frame work by means of bolts 40 (Fig. 2). Each of the rear plates 39 of chutes A, B and C is formed with a rectangular socket immediately below the discharge end of the chute, and each socket communicates with a horizontal aperture, as seen in Fig. 2. The rectangular socket of each chute receives a pressure block 41 provided with a stem 42 within the said horizontal aperture and pressed forward by a spring located within the said aperture, for the purpose hereinafter described. The chute D, which receives the bushings, is provided at its lower end with a cap member 43 having two vertical apertures 43ˣ by means of which the bushings are received from the chute in two parallel rows of superposed elements, as shown in Figs. 10 and 19.

*The ejector and transfer mechanism.*—The ejector mechanism removes a set of the chain parts from the chutes and delivers them to the transfer mechanism. The ejector members are rigidly fixed upon a vertical reciprocatory frame 70 of inverted U-shape, as shown in Fig. 10; a cross-bar 71 being secured to each vertical depending arm of the frame by means of screws 72. The cross-bar 71 of frame 70 is provided with a threaded aperture to receive a stud screw 73 which carries a friction roller 74 entering the cam slot 75 of a cam wheel 76 fixed upon shaft 50, the cam slot 75 being so arranged that intermittent vertical reciprocatory movements are imparted to frame 70. The ejector members Aˣ, Bˣ, Cˣ are arranged to coöperate with the chutes A, B and C for the links, while the ejector member Dˣ is arranged to coöperate with the chute D for the bushings. Each ejector member for the links is formed with a depending beveled nose $n$ (see Figs. 2 and 10) which projects below the bottom of plate 39 of the chute structure, and contacts with the outer face of spring-pressed block 41 and coöperates with the said block to close the chute. Each of the said ejector members for the links is provided with a countersunk seat 77, and the top of said seat is in line with the top of the chute, as shown in Fig. 2, affording a shoulder at that point. The action of the tamping mechanism will exert a pressure on the links within the chutes, and the lowermost link in each chute will be pressed into the seat 77 of its appropriate ejector member, so that the shoulder at the top of said seat will engage the upper edge of the link in each case. The spring-pressed block 41 located below each chute at its delivery end will prevent the link in the seat 77 from moving downwardly out of position when the ejector member is in upper or link receiving position, but as the top of each block 41 is beveled, it will afford no obstruction to the downward movement of the ejector member and the link carried thereby.

When the links are ejected from the chutes upon the downward movement of the ejector members, their descent is terminated by shoulders on the transfer members and thereupon a reverse and upward movement is given to frame 70, and the ejector members. But before the said upward movement of the ejector members takes place a set of plunger pins are projected through their respective openings in the transfer members and into the end apertures of the links, so that in the upward movement of the ejector members the links are held by the transfer members, as hereinafter more fully described. The ejector member Dˣ for the bushings is provided with two taps 78 in register with the open top slots 43ˣ in cap 43 (Figs. 10 and 19); and the open top slots 59ˣ in bushing transfer member are of a depth each to hold one bushing, so that in the downward movement of the ejector member Dˣ taps 78 press upon the columns of bushings in cap 43 and insure that two bushings will be moved downwardly into the slots in bushing-carrier 59. The transfer mechanism comprises a frame 44 slidingly supported upon the main frame F. The transfer frame 44 is provided with a central threaded aperture 45 to receive the upper threaded end of a stud screw 46 (see Figs. 2 and 16) which carries at its lower end a friction roller 47 fitted within the slot 48 of a cam wheel 49 (see Fig. 2). Cam wheel 49 is fixed upon shaft 50, and its cam slot is so arranged that the transfer frame 44 is given reciprocatory movements lengthwise of the machine to carry the parts from the chutes to the feeding mechanism. Fixed upon the transfer frame 44 by means of the screws 51 is a bracket plate 52 provided at its forward end with a seat at the base of which is a stop-shoulder 52ˣ shaped to conform with one edge surface of a link (preferably the longitudinal curved side of the link). Extending transversely of the seat in bracket plate 52 are two apertures 53 into which are slidingly fitted the two rods 54 connected at their inner ends by means of the head 55 carrying the projecting pin 56. The rods 54 have reduced forward ends 54ˣ of a diameter slightly less than the end apertures formed in the links. The ends 54ˣ of rods 54 will hereinafter be termed "plunger pins." The bracket plate 52 is held by frame 44 immediately below the chute A, and in the operation of the machine a member $n$ of the ejector mechanism will carry a link from chute A downward into the seat 52ˣ of the bracket plate at a time when the plunger pins 54ˣ are retracted, the link being held by the ejector member until the said plunger pins 54ˣ are brought forward and into the end apertures of the link to hold the latter in position when the ejector member is withdrawn. The frame 44 has fixed thereon, by means of the screws 57ˣ, a second bracket plate 57 also provided with apertures to receive two rods 54ᵃ having reduced ends or plunger pins 58, the rods being connected at their inner ends by a head 55ᵃ carrying a projecting pin 56. Below the plunger pins 58 the bracket plate 57 is provided with a stop-shoulder 64, shaped in accord with and for the same purpose as stop-shoulder 52ˣ. Intermediate the bracket plates 52 and 57 is a bushing-carrier 59 slidingly mounted on the frame 44 and formed at its forward end with the open-top slots 59ˣ for the reception of bushings from the vertical apertures 43ˣ in cap member 43 (Figs. 10 and 19). Into the inner end of the bushing-carrier 59 is threaded the reduced end of a rod 60 projecting through vertical flange 44ˣ of frame 44 and provided with a head 61 between which and flange 44ˣ is interposed a spiral spring 62 surrounding the rod. The transfer frame 44 also carries bracket plate 63 which is formed with parallel longitudinal apertures to receive two rods 54ᵇ connected by means of a head 55ᵇ carrying projecting pins 56. The rods 54ᵇ carried by bracket plate 63 are duplicates of those carried by bracket plates 52 and 57, and therefore have reduced ends or plunger pins 65 projecting through apertures formed in the said plate 63 above a stop-shoulder 66 for the links ejected from chute C. The bracket plate 63 is slidingly mounted on frame 44 and, like bushing-carrier 59, is provided with a threaded aperture at its inner end to receive the reduced threaded end of a rod 67 projecting through flange 44ˣ of transfer frame 44, and having at its end a head 68 between which and the flange 44ˣ is interposed a spiral spring 69 surrounding the rod.

The bushing-carrier 59 and bracket plate 63 in addition to their movement with the transfer frame to transfer a set of parts from the chutes to the feeding mechanism are also given a still greater movement or thrust, the one to press bushings into apertures at the adjacent ends of two links, and the other to press the final outer link onto the ends of two bushings.

The means for operating plunger pins 54ˣ, 58 and 65 will now be described. Assuming that the plunger pins are in retracted position, as shown in Fig. 2, and that the ejector members have descended, a set of links having been placed in position with their end openings in register with the plunger pin 54ˣ, 58, and 65, shaft 50 in its continued rotation will cause the active portion of cam slot 79 in cam wheel 49 to rock elbow lever 81 on its fulcrum so that the upper end of said elbow lever will swing outwardly and through its pivotal connection 83 with cam bar 84 (see Figs. 2, 3 and 12) move the latter to the left from the position shown in Fig. 12. Cam bar 84 is slidingly supported within an aperture formed in cross-plate Fˣ of the main frame F and is provided with a horizontally projecting portion 84ˣ formed with cam slots 85 (Fig. 3) into each of which projects a pin 56 carried by one of the heads 55, 55ᵃ, 55ᵇ connecting two rods 54 or 54ᵃ or 54ᵇ for a set of the plunger pins. In the movement of cam bar 84 to the right, from the position shown in Fig. 12, the plunger pins are caused to move forwardly into the end apertures of the links and at this movement cam slot 75 acts upon the roller of stud screw 73 to cause the upward movement of frame 70 and the ejector members. At this point of the machine operation the transfer frame 44 is moved bodily forward to transfer the set of parts carried thereby to the feeding mechanism.

The means for actuating the transfer frame 44, as hereinbefore described, comprises shaft 50, cam wheel 49 and friction roller 47.

Intermediate the feeding mechanism *per se* and the transfer mechanism is a vertically disposed supporting plate 86 seated upon a horizontal portion of the main frame F and provided with a shallow horizontal clearance slot 87 for the purpose hereinafter described. At the end of the forward movement of transfer frame 44 the set of chain parts carried thereby is placed against the face of supporting plate 86 at points slightly above and slightly below the clearance slot 87 at a time when the feeding members have reached the end of a feeding movement as will be hereinafter set forth. The chain parts are thus held until the feeding members are retracted and moved to the left from their advanced feeding position (Fig. 17) into the position shown in Fig. 18, and thence forwardly into initial feeding position. The feeding mechanism will now be described.

*The feeding mechanism.*—At its forward end the horizontal portion of the main frame F is provided with a channel 88 having undercut side walls to receive the base portion of a sliding frame 89 (Figs. 11–12), the latter frame being formed with a threaded aperture to receive the stud screw 90 carrying friction roller 91 which engages the peripheral cam slot 92 of a cam wheel 93 fixed upon shaft 50. The sliding frame 89 is provided with a transverse rib 89ˣ (Fig. 2) formed with divergently extending side walls in accord with the converging side walls of a groove in a feed carriage 94 slidingly mounted upon the said rib 89ˣ. The feed carriage 94 is provided with a vertically projecting plate 94ˣ formed with a horizontal row of apertures to receive a series of feed-pins, in this instance fourteen pins indicated a to n respectively, Figs. 17 and 18. The first three of these pins, a, b, c at their outer ends are of a diameter slightly less than the diameter of the link apertures, and the remaining pins at their outer ends are of a diameter slightly less than the interior diameter of the bushings. The feed carriage 94 is connected at 131 with the upper end of an elbow lever 132 fulcrumed at 133 upon the main frame F and carrying a friction roller 134 received within the cam slot 135 of a cam wheel 136 fixed upon shaft 50. In the initial movement of the feed carriage 94, cam 136 acts upon lever 132 to slide the carriage to the right (Fig. 11) upon frame 89 to impart a feeding movement to the chain elements. During the feeding movement of carriage 44, the transfer means is retracted. At the end of a feeding movement, cam 93 moves frame 89 with carriage 94 outwardly and the feeding pins are withdrawn from the link apertures as the transfer members advance and finally press the chain parts against the face of supporting block 86, the said chain parts being thus held in position until cam 136 acts to slide the feed carriage back into initial position immediately prior to an inward or forward movement of the frame 89 to again cause the feeding pins to enter link apertures for a succeeding feeding movement. The feeding carriage may be provided with adjustable stop members 137 to act against a block 137ˣ fixed upon the frame 89, (Fig. 11), if desired.

The feeding mechanism operates to advance the chain elements by intermittent movement so that an outer link 100 presented by bracket plate 52 is by successive feeding movements presented first to the bushing-carrier 59 which by successive operations presses two bushings 101 in its end apertures, secondly to link-transferring bracket plate 57 which by successive operations bridges the gap between said outer link and the preceding and succeeding outer links by the transfer of an "intermediate" or connector link or links 102, and thirdly to link-transferring bracket plate 63 which completes the chain unit by presenting to the first outer link its corresponding outer link 103, as illustrated in Figs. 17 to 18ᵃ inclusive.

*The assembling of the chain parts.*—In the operation of the machine above described, the chain is assembled in the following manner: The slide or ejector n moves an outer link down on to the shoulder 52ˣ on the slide 52, and while said slide n is in its lower position the pins 54ˣ advance and enter the holes in the said link. The slide n is then raised and the member 44 carrying with it the elements 52, 59, 57 and 63, together with the pins 54ˣ, 58 and 65 move forward the pins 54ˣ carrying with them said outer link, shown at 100 in Fig. 17ᵃ. This forward movement of the slide 44 serves to deliver the link to the pins a, b on the feeding member 94ˣ, the latter being in its forward position similar to that shown in Fig. 17, but with the parts in a position to the left of that shown in Fig. 17, that is, with the pins a, b opposite the pins 54ˣ. When said link has been delivered to the pins a, b, the slide 44 carrying the pins 54ˣ is retracted, and the member 94ˣ moves laterally to the right to the position shown in Fig. 17. In this first lateral feeding movement of the feeding carrier 94ˣ, the said outer link on the feed pins a, b is moved to the right until its foremost aperture, i. e., that one farthest to the right, comes into register with the first, i. e., that to the left, of two bushings carried by the bushing carrier 59, this position of the feeding means being shown in Fig. 17. Whereupon, the member 94ˣ comes to rest and the outer link is consequently held motionless on the pins a, b, and the transfer frame 44 moves forwardly and the bushing carrier 59 presses a bushing into the right hand or foremost link aperture and remains in forward position to hold the link, with its foremost aperture holding a bushing, pressed against the face of supporting member or plate 86, while the member 94ˣ and the feeding pins carried thereby are retracted and moved to the left to initial position (see Fig. 18). The next forward movement of the member 94ˣ causes the feeding pins c, d to enter the link apertures, the feeding pin d being smaller at its engaging end than the pin c, enabling it to fit within the said bushing now seated in the right-hand link aperture. At the same time that the pins c, d respectively enter the rearmost link aperture and the bore of the bushing in the foremost link aperture, the pins a, b enter the apertures of a link supported by the pins 54ˣ. Upon the retraction of the transfer means 44, the member 94ˣ and the feeding pins c, d carrying the first-named link and bushing are moved laterally to the right, and the said first-named link is advanced until its left-hand or rearward aperture comes into register with the right-hand bushing carried by the bushing carrier 59, whereupon, the transfer means is again advanced causing the carrier 59 to press its right-hand bushing into the left-hand link aperture, and its left-hand bushing into the right-hand aperture of the next succeeding outer link supported on the pins a, b, the right-hand aperture of the first link being in line with and supported by the first pin of a series of four pins 104 rigidly mounted on the part 57. The feeding device 94ˣ is then retracted and returned to its initial position, as heretofore described, the transfer means in the meantime holding the chain and supporting the same against the member 86. In the next forward movement of the member 94ˣ the pins $e$, $f$ mounted thereon enter the bores of the bushings seated in the link 100, and upon the lateral feeding movement of the part 94ˣ the link is placed with the bores of the bushings therein in register with the two innermost of said four holding pins 104 carried by said bracket plate 57, and the transfer means moving forward enters said pins 104 in said bushings, and holds the link against the member 86, whereupon, the member 94ˣ returns to its initial position. Upon the next forward movement of the member 94ˣ the pins $g$, $h$ enter the bores of the bushings, and upon lateral movement of the member 94ˣ the link with the bushings is moved to the right until its right-hand or foremost bushing comes into register with the left-hand plunger pin 58, and its left-hand bushing into register with the last pin 104, so that when the transfer means 44 again advances, two intermediate links 102 are presented to connect the rearward apertures of said intermediate links with the bushing in the forward end of the link 100, and the forward apertures of said links 102 with the rearward end of a preceding outer link corresponding to the link 100. The transfer means then holds the chain against the member 86 while the member 94ˣ returns to initial position. In the next forward movement of the member 94ˣ the pins $i$, $j$ enter the bushings in the links, and upon the lateral movement of the member 94ˣ, the outer link carrying the two bushings, and the intermediate links connected to the foremost bushing are shifted to the right until the left-hand bushing in the link 100 comes into register with the right-hand plunger pin 58, and with its right-hand bushing in line with an intermediate pin 104ˣ on the member 63, whereupon, the advance of the transfer frame 44 serves to connect the left-hand bushing on the link 100 to the right-hand aperture of two succeeding outer links supported by the pins 58, and said outer link is connected to the succeeding outer link by the forward bushing of the latter being inserted in the rear or left-hand aperture of said innermost links supported on the pins 58. The transfer slide then holds the chain against the member 86 and part 94ˣ again returns to its initial position. In the next forward movement of the part 94ˣ the pins $k$, $l$ enter the bushing apertures, and upon the lateral feeding movement of the part 94ˣ, the link with the parts connected thereto is moved to the right until the bushings in said link register with pins 65 on the part 63, and upon the advance of the frame 44 the chain unit is completed by applying to the said bushings a corresponding outer link 103 (see Fig. 17ᵃ). Thus each advance of the transfer frame serves to present in sequence from left to right all of the elements comprising a link structure, to wit: an outer link, two connecting bushings, two intermediate links serving to connect the said outer link with a preceding outer link, two intermediate links serving to connect the said outer link with a succeeding outer link, and finally a second outer link securing said sets of intermediate links with the first-named outer link, and said forward movement of the sliding transfer frame also effects the assembling of the said parts in their proper places in the chain structure.

Means are provided on the transfer frame 44 to exert an extra pressure upon the bushings when transferred into register with the initial outer link so that the same may be firmly seated within the apertures of said link, and also to exert an extra pressure upon the outer link 103 in forcing the same upon the said bushings to complete the chain unit at said point. To this end the rods 60 and 67 connected respectively to the bushing-carrier and the bracket plate 63 are given a forward thrust, after the termination of each forward movement of transfer frame 44, by the following instrumentalities (see Figs. 2, 3 and 16): Slidingly mounted upon the upper horizontal portion of main frame F at the rear of the transfer frame 44 is a frame 104ᵃ operatively connected by means of stud screw 105 and friction roller 106 with the peripheral cam slot 107 of a cam wheel 108 fixed upon shaft 50ˣ which extends longitudinally of the main frame F and in line with shaft 50. Frame 104ᵃ is provided with a transverse vertically-projecting boss 109 which is provided with threaded apertures to receive the reduced threaded ends of two studs 110 each in line with one of the heads 60 and 68 at the ends of rods 61 and 67. At the end of a forward movement of transfer frame 44 the stud-carrying frame continues to advance until studs 110 exert a pressure upon rods 60 and 67 in opposition to springs 62 and 69, and the bushing-carrier and bracket plate 63 are each given a forward thrust for the purpose hereinbefore described.

The driving mechanism for the machine includes a shaft 111 extending transversely of the machine at the rear end thereof and provided with a band wheel 112 (see Fig. 2). Shaft 111 is journaled near one end thereof within a bearing boss 113 at the lower end of a sleeve 114 loosely fitted upon a stud 115 projecting from frame F (Figs. 2 and 3). Near its opposite end shaft 111 is journaled within a bearing block 116 formed with a shouldered head 117 held in position by an elbow latch-lever 118 fulcrumed at 119 upon the frame F. Intermediate of its length, shaft 111 is provided with a worm 111× (see Fig. 2) in mesh with a worm wheel 120 fixed upon shaft 50×. Motion is transmitted by shaft 50× to shaft 50 through a safety-stop connection. That is to say, the connection is such that undue load imposed upon the machine will render the connection ineffective to actuate shaft 50 from shaft 50× and the parts driven by the latter, as will hereinafter more fully appear.

*The safety-stop mechanism.*—The connection between shafts 50 and 50× (see Figs. 2, 13 and 14) comprises a disk 121 fixed upon the rear end of shaft 50 opposite to a disk 122 of similar diameter fixed upon the adjacent end of shaft 50×. Into oppositely-disposed threaded apertures in disk 122 are threaded the reduced ends of two socket members 123 each housing a spring-pressed beveled-faced plunger pin 124 adapted to enter one of two apertures 125 and 126 formed in the disk 121. Each of the socket members 123 is provided with an aperture at its rear end through which the stem of the plunger pin may be projected against the pressure of its spring. At the rear of the disk 122 and in line with the path of movement of the socket members 123 is a U-shaped plate 127 pivotally supported at 128 upon an arm 129 projecting from the main frame F. At its free end plate 127 is formed with an arm 127× in angular formation at its end and having a cam face 130 in contact with the upper arm of the elbow latch-lever 118.

Through the above described driving connections means are provided for stopping the machine whenever any of the chain elements are improperly handled and "jam" the machine, the increased load upon the disk 121 compelling the beveled-face plunger pins 124 to move rearwardly, their stems forcing plate 127 backwardly and thereby lifting latch-lever 118 to release bearing block 116, the resultant downward movement of shaft 111 withdrawing its worm from engagement with worm wheel 120 and bringing the entire machine to a stop.

The feeding pins b and c on the feeding means are spring yielding and are connected with rods 138, 139 respectively movable within parallel apertures in bracket 140, the said bracket being secured upon the upper face of the feed carriage 94 by screws 141. A spiral spring 138ª surrounds each rod 138, 139 intermediate the bracket 140 and a feeding pin and acts to maintain the pin normally in forward position (see Figs. 3 and 18). The rods 138, 139 at their rear ends abut crank arms 142, 143 depending respectively from a rock shaft 144 and a second rock shaft 145 mounted to oscillate within sleeves 146 at the upper ends of two brackets 147 secured upon the feed carriage 94 (see Fig. 11). The rock shafts at their outer ends are provided with the arms 148, 149 in contact with the upper ends of two vertical rods 150, 151 slidingly fitted within alined apertures formed in the bosses 152, 153 of a bracket 154 projecting from the main frame F (Fig. 11). Each rod 150, 151 at its lower end is in contact with one of two safety-stop arms 155, 156 pivoted at 157 upon bracket 154 and pressed downward in contact with the periphery of cam wheel 136 by means of suitable springs, such as 158 (Fig. 11). The end of each safety-stop arm 155, 156 lies in the path of one of two stop pins 159, 160 on the cam wheel 136 (see Figs. 11 and 15) capable of stopping the machine when thrown into contact with the arm, by compelling the retraction of pins 124 in the driving disk 122, and the consequent movement of latch lever 118, the release of bearing block 116, and the withdrawal from worm wheel 120 of its driving worm, as hereinbefore described.

The stop and transfer mechanisms, however, are so timed that when at the termination of a forward movement of the latter the bushing-carrier presses two bushings into the adjacent end apertures of two links held on feeding pins a, b and c, d, the bushings force pins b and c backward—a movement which actuates each rod 138, 139 and its connections to lift the stop arms out of the path of the stop pins 159, 160 at the instant of the approach of the latter. But in event that an interruption occurs in the proper transfer of a bushing, its absence prevents the backward movement of one rod 138 or 139 and the stop mechanism causes the machine to come to a rest until the fault is remedied. A hand, foot or power operated lever may be employed to again lift shaft 111 into driving position; or rod 161 (Fig. 14) may be grasped by the operator in the lifting of the shaft and bearing block 116 by hand.

It is necessary, of course, that the relative positions of the operating cams on shafts 50 and 50× remain constant. Therefore in reconnecting disks 121 and 122 a given plunger pin 124 must always enter its appropriate aperture 125 and not the second aperture. To this end one of the pins and its appropriate aperture may be shaped differently from the second pin and aperture, or else placed in slightly different position radially of the disks.

It will be understood that various modifications may be made in the form and arrangement of the various trains of mechanism herein described without departing from the spirit of the invention. Although I have illustrated means for ejecting and transferring two "intermediate" links, it is merely a matter of size and proportion in the chute openings, length of transfer and feed pins, width of stop shoulder, etc., to eject transfer and feed a desired number of outer or intermediate links from any one or all of the chutes. In Figs. 16 and 20 I have illustrated means for applying to the rods 54, 54ª, 54ᵇ the frictional pressure of resilient blocks 162 seated within apertures formed in the plates 52, 57, 63 and held in adjusted position by screws 163 and caps 164. In this manner the pins 54ˣ, 58 and 65 are held against motion until the aforesaid rods are positively actuated by cam bar 84. Any convenient mechanism other than the cam wheel 49 and friction roller 47 may be employed for imparting reciprocatory movement to the transfer mechanism, and this is equally true with respect to each of the trains of mechanism employed in the machine.

What I claim and desire to secure by Letters Patent of the United States is:—

1. In a chain assembling machine, the combination of a feeding device, a transfer device adapted to receive a set of links and bushings and to transfer the same to the feeding device, and means for intermittently and relatively shifting the transfer and feeding devices to register the links carried by one with the bushings carried by the other.

2. In a chain assembling machine, the combination of containers, a transfer device and means for delivering a set of links and bushings thereto from the containers, a feeding device receiving from the transfer device, and means for intermittently and relatively shifting the transfer and feeding devices to register the links carried by one with the bushings carried by the other.

3. In a chain assembling machine, the combination of a feeding device, a transfer device adapted to receive a set of links and bushings, means for moving the transfer device toward and from the feeding device, and means for shifting the feeding device prior to each operative movement of the transfer device.

4. In a chain assembling machine, the combination of a feeding device, a transfer device adapted to receive a set of links and bushings and to transfer links to bushings held by the feeding device and bushings to links held by said feeding device, means for intermittently shifting the feeding device in reverse directions, and a supporting means against which the links and bushings are held by the transfer device during one movement of the feeding device.

5. In a chain assembling machine, the combination of a feeding device, a transfer device adapted to receive a set of links and bushings and to transfer links to bushings held by the feeding device and bushings to links held by said feeding device, a series of pins carried by the feeding device and adapted to enter apertures in the links and bushings, a fixed supporting member adjacent the pins of the feeding device, means for moving the feeding device both longitudinally and transversely of the supporting member, and means for actuating the transfer device with an intermediate dwell to hold the links and bushings against the supporting member during idle movements of the feeding device.

6. In a chain assembling machine, the combination of a container, a transfer device provided with a series of endwise-movable plunger pins, an ejector adapted to carry a set of apertured links from the container to the transfer device, means for supplying bushings to the transfer device, means for retracting the said pins during an active movement of the ejector and for thereafter projecting said pins into the link apertures, a feeding device receiving from the transfer device, and means for intermittently and relatively shifting the transfer and feeding devices to register the links carried by one with the bushings carried by the other.

7. In a chain assembling machine, the combination of a container, a transfer device provided with a series of endwise-movable pins, an ejector adapted to carry a set of links from the container to the transfer device, means for supplying bushings to the transfer device, means for retracting the pins during the active movement of the ejector and for thereafter projecting them into the link apertures, a feeding device provided with a series of pins, a supporting plate intermediate the transfer and feeding devices, actuating means for the feeding mechanism, and means for actuating the transfer mechanism to carry the set of links and bushings against the supporting plate and thereafter to retract the endwise-movable pins.

8. In a chain assembling machine, the combination of a container, a transfer device, means adapted to carry a set of links and bushings from the container to the transfer device, a feeding device adapted to receive the said set of links and bushings and position the same with respect to a succeeding set, and a supporting plate coöperating with the transfer device to hold the links and bushings in position preliminary to the engagement thereof by the feeding device.

9. In a chain assembling machine, the combination of a container, a transfer device, of a stop shoulder on said transfer device and an endwise-movable pin above said shoulder, an ejector adapted to carry an apertured link from the container into engagement with the stop shoulder on the transfer device, and means for retracting said endwise-movable pin during the active movement of the ejector and thereafter projecting said pin into a link aperture.

10. In a chain assembling machine, the combination with a chute and a transfer device, of a stop shoulder on said transfer device and an endwise-movable pin above said shoulder, a spring-pressed beveled-top block below the mouth of said chute, an ejector having a depending nose engaged by said block and also having a shoulder above the upper wall of the chute, means for reciprocating said ejector and means for retracting said endwise-movable pin during the active movement of the ejector.

11. In a chain assembling machine, the combination of a feeding device, a transfer device comprising a frame supporting a bushing-carrier and a plurality of link-carriers, means for actuating said frame to carry a set of links and bushings into register with a previously transferred set held by the feeding device, and means for thereafter imparting a movement to the bushing-carrier and a link-carrier relatively to the frame.

12. In a chain assembling machine, the combination of a feeding device, a transfer device comprising a frame, a bushing-carrier and a plurality of link-carriers mounted on said frame, a rod projecting rearwardly from the bushing-carrier, a rod projecting rearwardly from a link-carrier, a buffer spring for each rod, means for actuating said frame to carry a set of links and bushings into register with a previously transferred set held by the feeding device, and a contact member adapted to thereafter engage and impart a thrust to said rods.

13. In a chain assembling machine, in combination, a container, an ejector adapted to remove an apertured link from the container, a link-carrier in register with the ejector, a plunger pin mounted on the carrier and adapted to enter a link aperture, and means for imparting endwise movements to said pin.

14. In a chain assembling machine, the combination of a series of chutes, an ejector adapted to remove a set of apertured links and bushings from said chutes, and a transfer device adapted to receive said set of links and bushings and said transfer device comprising a frame, a bushing-carrier, and a plurality of link-carriers on said frame, plunger pins carried by said link-carriers, a cam bar operatively connected with the plunger pins, and means acting upon said cam bar to project said pins into the link apertures at the end of each active movement of the ejector.

15. In a chain assembling machine, in combination, a container, a device adapted to receive a set of links and bushings from the container, a feeding device, and means for transferring said set to and into register with links and bushings held by the feeding device.

16. In a chain assembling machine, in combination, a container, a feeding device, a device adapted to receive a set of links and bushings from said container, means for transferring said set to the feeding device, and means for intermittently and relatively shifting the feeding device and the transferring means.

17. In a chain assembling machine, in combination, a bushing and link transfer device comprising a frame, a bushing-carrier and a plurality of link-carriers mounted on said frame, means whereby the bushing-carrier and a link-carrier may be moved relatively to the frame, and a plurality of pins supported by the link-carriers.

18. In a chain assembling machine, the combination of a container, a device adapted to transfer a set of links and bushings from said container, a feeding device adapted to receive said set and comprising a frame, means for reciprocating said frame, a carriage slidably mounted on said frame and provided with holding means for said set, and means for reciprocating said carriage relatively to the frame.

19. In a chain assembling machine, a feeding device for apertured links and bushings comprising a supporting plate and a carriage provided with a series of pins adapted to enter the link and bushing apertures and to support the same adjacent said plate, means for imparting a bodily feeding movement to the carriage, means for retracting the carriage to withdraw its pins from the link and bushing apertures preliminary to its return to initial feeding position, and means for clamping the links and bushings against the supporting plate upon the retraction of the said carriage.

20. In a chain assembling machine, the combination of a container and a feeding device, of a transfer device provided with a series of pins and means whereby said pins are caused to enter the apertures of and to support links ejected from the container, link-holding members carried by the feeding device, means for moving the transfer and feeding devices into coöperative relation, and means whereby the pins of the transfer device may be retracted as the links supported thereby are transferred to the feeding device.

21. In a chain assembling machine, the combination of a frame, a link transfer device and a feeding device, a hopper supported by said frame, a rotary cone within and having a lower circumferential flange communicating with an opening through the wall of said hopper, a deflecting blade supported at one side of said opening, and means for rotating said cone.

22. In a chain assembling machine, the combination of a frame, a link transfer device and a feeding device, a hopper supported by said frame, a rotary cone within and having a lower circumferential flange communicating with an opening through the wall of said hopper, a deflecting blade supported at one side of said opening, a channeled slideway communicating with said opening at the exterior of the hopper, a chute, an opening in said slideway communicating with said chute, and means for rotating said cone.

23. In a chain assembling machine, the combination of a frame, a link transfer device and a feeding device, a hopper supported by said frame, a rotary cone within and having a lower circumferential flange communicating with an opening through the wall of said hopper, a deflecting blade supported at one side of said opening, a slideway communicating with said opening at the exterior of the hopper, a chute, an opening in said slideway communicating with said chute, a reciprocatory spring-yielding tamping device in register with the opening in said slideway.

24. In a chain assembling machine, the combination of a frame, a link transfer device and a feeding device, a plurality of hoppers supported by said frame, a rotary cone within and having a lower circumferential flange communicating with an opening through the wall of each hopper, a deflecting blade supported at one side of said opening, a series of chutes, a slideway intermediate each hopper opening and one chute, an opening in each slideway communicating with its chute, a plate supported for reciprocatory movement in the frame, a plurality of housings in said plate, a spring-pressed tamping member in each housing and in register with a slideway opening, means for reciprocating said plate, and means for rotating each cone.

25. In a chain assembling machine, the combination of a frame, a hopper supported thereby, a rotary cone within the hopper and formed with a circumferential flange communicating with an opening in the hopper wall, a beveled turning blade supported at the far side of the opening in the direction of rotation of the cone, a relatively short turning blade at the near side of the said opening, and means for rotating said cone.

26. In a chain assembling machine, the combination of a frame, a link transfer device and a feeding device, a receptacle supported on said frame and adapted to hold bushings, a chute leading from said receptacle, a sleeve embracing said chute and projecting above the same in the receptacle, and means for reciprocating said sleeve.

27. In a chain assembling machine, the combination of driving means including a safety-stop device, a container, a feeding device, means including a transfer device for delivering a set of links and bushings from the container to the feeding device, and means carried by the feeding device and operating upon an interruption in the delivery of bushings to throw into action the safety-stop device.

28. In a chain assembling machine, the combination of driving means including a driving shaft and a stop device operable upon each rotation of the driving shaft, a container, feeding device, means including a transfer device for delivering a set of links and bushings from the container to the feeding device, and means carried by the feeding device and including a bushing delivered thereto for rendering the stop device inactive.

29. In a chain assembling machine, the combination of a frame, driving means including a driven shaft, a driving shaft, a yielding connection between the said shafts, a stop member carried by the driven shaft and a contact member therefor movably supported on the frame, an operating member adapted to move said contact member out of the path of the stop member, a container for bushings, a feeding device, means including a transfer device for delivering bushings from the container to the feeding device, and means carried by the feeding device and including a bushing delivered thereto for actuating said operating member.

30. In a chain assembling machine, the combination of a frame and driving means including a driven shaft and a driving shaft, a yielding connection between said shafts, a pivotally mounted power-transmitting shaft and a latch device holding the same normally in operative engagement with the driving shaft, a container, a feeding device, means including a transfer device for delivering a set of links and bushings from the container to the feeding device, and an operative connection between said yielding connection and the latch device acting to move the latter to releasing position when abnormal drag upon the machine overcomes the said yielding connection.

31. In an assembling machine for a chain composed of apertured links and a connecting element fitted within the alined aperture of successive links, a device adapted to receive and support a link, a device adapted to receive and support a connecting element in register with an aperture of said link, and means for relatively moving the said devices toward and from each other.

32. In an assembling machine for a chain composed of apertured links and a connecting element fitted within the alined apertures of successive links, a device adapted to receive and support a link, a device adapted to receive and support a connecting element in register with an aperture of said link, means for relatively moving the said devices toward and from each other to assemble the chain elements supported thereby, and means for progressively feeding the chain thus assembled.

33. In a machine for assembling a chain comprising links and bushings, means for arranging the links and bushings in a predetermined order, and means for progressively bringing the links and bushings into the positions relative to each other which they occupy in the finished chain, and for securing the same together.

34. In a machine for assembling a chain comprising links and cross connecting elements, means for arranging the links and connecting elements in a predetermined order, and means for progressively bringing the links and connecting elements into the positions relative to each other which they occupy in the finished chain, and for securing the same together.

35. In a machine for assembling a chain comprising links and bushings, means for arranging the links and bushings in a predetermined order, and means entering the openings in the links and bushings for progressively bringing the links and bushings into positions relative to each other which they occupy in the finished chain, and for securing the same together.

36. In a machine for assembling a chain comprising links and bushings, means for arranging the links and bushings in a predetermined order, and pin means entering the openings in the links and bushings for progressively bringing the links and bushings into positions relative to each other which they occupy in the finished chain, and for securing the same together.

37. In a machine for assembling a chain comprising links and bushings, means for supporting a plurality of links and bushings in a predetermined order, means for supplying links and bushings to said supporting means, means for imparting a forward movement to said supporting means, a feeding mechanism having movement toward said supporting means and also transversely of the latter, and means carried by the feeding means for receiving links and bushings from the said supporting means and moving them progressively into the positions they occupy in the finished chain and for securing the same together.

38. In a machine for assembling a chain comprising links and bushings, means for supporting a plurality of links and bushings in a predetermined order, means for supplying links and bushings to said supporting means, means for imparting a forward movement to said supporting means, a feeding mechanism having movement toward said supporting means and also transversely of the latter, and pin means carried by the feeding means for receiving links and bushings from the said supporting means and moving them progressively into the positions they occupy in the finished chain and for securing the same together.

39. In a chain assembling machine, the combination of a feeding device having a plurality of spaced pins, a transfer device adapted to receive a set of links and bushings and to transfer the same to said pins, and means for intermittently and relatively shifting said transfer and feeding devices for progressively bringing the links into the relative positions which they occupy in the finished chain, and for securing the same together.

40. In a machine for assembling a chain comprising links and bushings, means for arranging the links and bushings in a predetermined order, a feeding device having a plurality of pins, a supporting member between said first-named means and said feeding device, means for moving said first-named means to hold the links and bushings carried thereby against said supporting member, means for moving the feeding means toward said first-named means to cause said pins to enter the said links and bushings held against said member, means for retracting said first-named means, and means for moving the feeding means laterally to progressively move the links and bushings previously delivered thereto to another position relative to the first-named means to receive another set of links and bushings in progressive assembling relation to the said links and bushings previously delivered to said pins.

41. In a chain assembling machine, the combination of a feeding device, transfer means comprising a bushing carrier and a plurality of link carriers, a buffer spring for each carrier, means for moving said carriers to carry a set of links and bushings into assembling register with a previously transferred set held by the feeding device, and means to thereafter impart a thrust to said bushing carrier and one of said link carriers.

42. In a chain assembling machine, the combination of a feeding device, transfer means comprising a link carrier, a bushing carrier and a second and third link carrier arranged in sequence, a pair of projectable and retractable pins associated with each link carrier and adapted to be projected through apertures of links on said carriers, means for causing relative movement between said carriers and feeding device to transfer links and bushings therefrom to the feeding device, and means for moving said feeding device into position to register the set of links and bushings carried thereby with subsequent links and bushings transferred by the transfer device.

43. In a chain assembling machine, the combination of a feeding device, a transfer device comprising a frame, a bushing-carrier and a plurality of link-carriers mounted on said frame, a buffer spring for the bushing carrier and a link carrier, means for actuating said frame to transfer bushings and links to said feeding device, and means to thereafter impart a thrust to said bushing-carrier and the link-carrier having a buffer spring.

44. In a chain assembling machine, the combination of a transfer device comprising a bushing carrier and a plurality of link carriers, a feeding device, means for causing relative movement between the transfer device and the feeding device to transfer links and bushings from the former to the latter, and means to impart an additional relative thrust to the bushing carrier and one of said link carriers.

45. In a chain assembling machine, the combination of a transfer device having means for supporting a link, a pair of bushings, a second link, and a third link in sequence, feeding means to receive said links and bushings from the transfer device and to advance the same relative to a subsequent set of links and bushings supported by the transfer device, and means to cause a relative movement between the transfer device and the feeding device to assemble the advanced set of links and bushings with the subsequently transferred set of links and bushings.

46. In a chain assembling machine, the combination of a transfer device having means for supporting a link, a pair of bushings, a second link and a third link in sequence, a supporting means, means to cause a relative movement between the transfer device and said means whereby the links and bushings are held between said transfer device and supporting means, feeding means receiving the links and bushings while so held, means for moving said feeding means to advance said links and bushings relative to a subsequent set of links and bushings supported by the transfer device, and for causing relative movement between the transfer device and the feeding device to assemble the chain parts carried by one with the chain parts carried by the other.

47. In a machine for assembling a chain comprising links and bushings, means for arranging the links and bushings in a predetermined order, and means for progressively bringing the links and bushings into the positions relative to each other which they occupy in the finished chain, and for securing the same together, driving means for operating both said means, and means for automatically stopping said driving means upon derangement of one of said chain parts from proper position for assembling.

48. In a chain assembling machine, the combination of a transfer means comprising a reciprocable frame, a link-carrier, a bushing-carrier, and second and third link-carriers arranged in sequence on and carried by said frame, said bushing-carrier and third link-carrier being reciprocable relative to said frame, a relatively fixed supporting member against which links and bushings are held on one movement of reciprocation of said frame, a feeding device reciprocable toward and away from said frame and said support, means for moving said feeding device toward the frame to receive chain parts held by said carriers, and means for imparting an additional movement to the bushing-carrier and third link carrier while the feeding device is engaged with the chain parts carried by said carriers.

49. In a chain assembling machine, the combination of a transfer means comprising a reciprocable frame, a link-carrier, a bushing-carrier, and second and third link-carriers arranged in sequence on and carried by said frame, said bushing-carrier and third link-carrier being reciprocable relative to said frame, a relatively fixed supporting member against which links and bushings are held on one movement of reciprocation of said frame, a feeding device reciprocable toward and away from said frame and said support, and also reciprocable transversely of the same, means for moving said feeding device toward the frame to receive chain parts held by said carriers, means for imparting an additional movement to the bushing carrier and third link carrier while the feeding device is engaged with the chain parts carried by said carriers, and means for reciprocating said feeding means transversely of said frame.

50. In a chain assembling machine, the combination of a transfer means comprising a reciprocable frame, a link-carrier, a bushing-carrier and second and third link-carriers arranged in sequence on and carried by said frame, said bushing-carrier and third link-carrier being reciprocable relative to said frame, a pair of pins on each link-carrier, a relatively fixed supporting member against which links and bushings are held on one movement of reciprocation of said frame, means for projecting said pins through the links while the latter are being carried toward said supporting member, a feeding device reciprocable toward and away from said frame and said support, and means for moving said feeding device toward the frame to receive chain parts held by said carriers, and means for imparting an additional movement to the bushing-carrier and third link-carrier while the feeding device is engaged with the chain parts carried by said carriers.

51. In a chain assembling machine, the combination of two means movable toward and away from each other to assemble chain parts comprising links and bushings, means for supplying links and bushings to said means for assembling thereby driving means for imparting relative movement to said two means, and means whereby absence of a bushing from assembling position stops the assembling movement of said assembling means.

52. In a chain assembling machine, a transfer device and a feeding device adapted to assemble links and bushings into chain form, said feeding device including a pin adapted to receive a bushing, driving means, and means whereby the absence of a bushing on said pin stops said driving means.

53. In a chain assembling machine, the combination of a means to support a plurality of links and bushings in a predetermined order, means to supply links and bushings to said first-named means, means adapted to receive a set of links and bushings from said first-named means, means to cause relative movement between said first-named means, and said receiving means to transfer links and bushings from one to the other in assembled relation, and means for imparting a feeding movement to said receiving means while the chain parts are carried thereby.

54. In a chain assembling machine, the combination of two mechanisms one of which is adapted to primarily receive and support a set of links and bushings in a predetermined order, means to cause relative movement between said mechanisms whereby said set of links and bushings is transfererd to the other mechanism, means for causing feeding movement of said other mechanism so as to carry the chain parts thereon in position to be assembled with a subsequent set carried by the mechanism for primarily receiving and supporting said links and bushings.

55. In a chain assembling machine, the combination of means for supporting links and bushings in a predetermined order, holding means, means for causing a relative movement between said first-named means and holding means to support links and bushings, feeding means movable into position to receive said links and bushings from said first-named means while the latter is in said holding position, means for imparting a lateral feeding movement to said feeding means in the direction of the chain length while the first-named means is out of holding relation to the holding means.

56. In a chain assembling machine, the combination of means for supporting links and bushings in a predetermined order, holding means, means for causing a relative movement between said first-named means and holding means to support links and bushings, feeding means movable into position to receive said links and bushings from said first-named means while the latter is in said holding position, means for imparting a lateral feeding movement to said feeding means in the direction of the chain length while the first-named means is out of holding relation to the holding means, and means for returning the feeding means to initial position to engage the chain parts.

57. In a chain assembling machine, the combination of means for supporting links and bushings in a predetermined order, a holding member, means for reciprocating said first-named member toward and away from said holding member and to hold said links and bushings against said member, feeding means for coöperating with the first-named means to receive links and bushings therefrom in assembled relation, means for causing a feeding movement of the feeding means in the direction of the chain length while the first-named member is out of holding relation to the said holding member, and means for returning the feeding means to initial position receiving the links and bushings during the holding action of said first-named means.

58. In a chain assembling machine, the combination of means for supporting links and bushings in a predetermined order, a holding member, means for reciprocating said first-named member toward and away from said holding member and to hold said links and bushings against said member, feeding means for coöperating with the first-named means to receive links and bushings therefrom in assembled relation, means for causing a feeding movement of the feeding means in the direction of the chain length while the first-named member is out of holding relation to the said holding member, means for returning the feeding means to initial position receiving the links and bushings during the holding action of said first-named means, and feeding means each including a plurality of pins adapted to enter the apertures of the links and the bores of the bushings.

In testimony whereof I have hereunto signed my name in the presence of two subscribing witnesses.

FRIEDERICH MÜLLER.

Witnesses:
 PARK C. BOYD,
 C. A. PEASE.

It is hereby certified that in Letters Patent No. 1,365,940, granted January 18, 1921, upon the application of Friederich Müller, of Hartford, Connecticut, for an improvement in "Chain-Assembling Machines," an error appears in the printed specification requiring correction as follows: Page 7, line 75, for "(Fig. 11)" read *(Figs. 2, 3 and 11)*; and that the said Letters Patent should be read with this correction therein that the same may conform to the record of the case in the Patent Office.

Signed and sealed this 22d day of February, A. D., 1921.

[SEAL.]

L. B. MANN,
*Acting Commissioner of Patents.*

Cl. 59—16.